United States Patent
Santoro

(10) Patent No.: US 9,387,354 B1
(45) Date of Patent: Jul. 12, 2016

(54) HARNESS WITH UPPER BODY EXERCISER

(71) Applicant: Vincent Santoro, Massapequa, NY (US)

(72) Inventor: Vincent Santoro, Massapequa, NY (US)

(*) Notice: Subject to any disclaimer, the term of this patent is extended or adjusted under 35 U.S.C. 154(b) by 0 days.

(21) Appl. No.: 14/927,884

(22) Filed: Oct. 30, 2015

Related U.S. Application Data

(63) Continuation-in-part of application No. 14/089,541, filed on Nov. 25, 2013, now Pat. No. 9,199,114, and a continuation-in-part of application No. 29/505,232, filed on Aug. 4, 2015, which is a continuation-in-part of application No. 14/089,541, filed on Nov. 25, 2013, now Pat. No. 9,199,114.

(51) Int. Cl.
  *A63B 21/015* (2006.01)
  *A63B 21/012* (2006.01)
  *A63B 24/00* (2006.01)
  *A63B 23/12* (2006.01)

(52) U.S. Cl.
  CPC ......... *A63B 21/0125* (2013.01); *A63B 23/1272* (2013.01); *A63B 24/0062* (2013.01)

(58) Field of Classification Search
  CPC ............. A63B 21/015; A63B 21/1449; A63B 22/0605; A63B 21/1434; A63B 2220/54; A63B 21/1411; A63B 21/1484; A63B 21/1469; A63B 21/0442; A63B 2022/06; A63B 2022/0605; A63B 2022/0611; A63B 2022/0617; A63B 2022/0623; A63B 2022/0629; A63B 2022/0635; A63B 2022/0641; A63B 21/1403; A63B 21/1407; A63B 21/1415; A63B 21/1476; A63B 22/00; A63B 22/0002; A63B 22/0007; A63B 22/0012; A63B 23/00; A63B 23/1245; A63B 23/1254; A63B 23/1263; A63B 23/1272; A63B 21/00185; A63B 21/026; A63B 21/1419; A63B 21/1423; A63B 21/2104; A63B 23/035; A63B 23/12; A63B 23/1209; A63B 23/1281
  USPC .......... 482/51, 57–66, 92, 114–119, 139, 148, 482/904; 224/265; 74/523
  See application file for complete search history.

(56) References Cited

U.S. PATENT DOCUMENTS

| | | |
|---|---|---|
| 1,402,179 A | 1/1922 | Piscitelli |
| 1,432,013 A | 10/1922 | Blake |
| 1,618,273 A | 2/1927 | Davidson |
| 2,097,376 A | 10/1937 | Marshman |
| 2,190,895 A | 2/1940 | Turpin |
| 2,668,709 A | 2/1954 | Boyko |
| 2,817,524 A | 12/1957 | Sadler |
| 2,854,880 A | 10/1958 | Waters |
| 3,224,765 A | 12/1965 | Baker et al. |
| 3,227,447 A | 1/1966 | Baker et al. |
| 3,309,084 A | 3/1967 | Simmons |
| 3,662,747 A | 5/1972 | Williams |
| 4,060,241 A | 11/1977 | Hegel |
| 4,225,130 A | 9/1980 | Zimmerman |

(Continued)

*Primary Examiner* — Oren Ginsberg
*Assistant Examiner* — Andrew S Lo
(74) *Attorney, Agent, or Firm* — Alfred M. Walker

(57) ABSTRACT

A portable upper body exerciser which is compatible with walking or using a treadmill permits vigorous upper body exercise involving hands, arms, biceps, triceps, shoulders, and neck. The upper body exerciser is a harness that rests on the shoulders and/or mid back and waist of a person with a forward extension member presenting handgrips at the distal ends of a hand crank that can be rotated much as bicycle pedals are rotated by the feet. The hand crank is positionably movable and attachable anywhere along the outer surface of the forward extension member, for the convenience of the person using the portable upper body exerciser.

14 Claims, 13 Drawing Sheets

(56) References Cited

U.S. PATENT DOCUMENTS

| | | |
|---|---|---|
| 4,387,839 A | 6/1983 | Dranchak |
| 4,717,146 A | 1/1988 | Nohara |
| 4,722,522 A | 2/1988 | Lundgren |
| 4,925,184 A | 5/1990 | McJunkin et al. |
| 4,961,573 A | 10/1990 | Wehrell |
| 4,973,046 A | 11/1990 | Maxwell |
| 4,986,537 A | 1/1991 | D'Orta |
| 5,005,829 A | 4/1991 | Caruso |
| 5,042,799 A | 8/1991 | Stanley |
| 5,108,092 A | 4/1992 | Hurst |
| 5,137,272 A | 8/1992 | Wilkinson |
| 5,141,223 A | 8/1992 | Block |
| 5,176,377 A | 1/1993 | Wilkinson |
| 5,178,593 A | 1/1993 | Roberts |
| 5,234,395 A | 8/1993 | Miller et al. |
| 5,312,312 A | 5/1994 | Fernandez et al. |
| 5,328,432 A | 7/1994 | Gvoich |
| 5,462,508 A | 10/1995 | Schiavone |
| 5,573,158 A | 11/1996 | Penn |
| 5,580,338 A | 12/1996 | Scelta et al. |
| 5,618,247 A | 4/1997 | Perez |
| 5,647,822 A | 7/1997 | Avganim |
| 5,720,702 A | 2/1998 | Lee |
| 5,800,323 A | 9/1998 | Ansel |
| 5,846,169 A | 12/1998 | Tscheschlog |
| 5,860,941 A | 1/1999 | Saringer et al. |
| 5,871,421 A | 2/1999 | Trulaske et al. |
| 5,902,218 A | 5/1999 | Froelich, Sr. |
| 5,916,070 A | 6/1999 | Donohue |
| 6,544,147 B1 | 4/2003 | Wang et al. |
| 6,547,701 B1 | 4/2003 | Eschenbach |
| 6,659,921 B2 | 12/2003 | Vernon |
| 6,764,231 B1 | 7/2004 | Shubert |
| 6,893,382 B1 | 5/2005 | Moon et al. |
| 6,905,447 B1 | 6/2005 | Walter |
| 7,303,513 B1 | 12/2007 | Curtiss |
| 7,445,584 B2 | 11/2008 | Wu |
| 7,470,221 B1 | 12/2008 | Ramos |
| 7,530,932 B2 | 5/2009 | Lofgren et al. |
| 7,695,410 B2 | 4/2010 | Kim |
| 7,727,125 B2 | 6/2010 | Day |
| 7,740,572 B2 | 6/2010 | Verheem |
| 7,837,599 B2 | 11/2010 | Kowalczewski et al. |
| 7,942,793 B2 | 5/2011 | Mills et al. |
| 7,988,601 B2 | 8/2011 | Bowser |
| 8,398,529 B2 | 3/2013 | Ellis |
| 2003/0092536 A1 | 5/2003 | Romanelli et al. |
| 2004/0157708 A1 | 8/2004 | Matthews |
| 2004/0198563 A1 | 10/2004 | Howell et al. |
| 2005/0014614 A1 | 1/2005 | Ahman |
| 2005/0040193 A1 | 2/2005 | May |
| 2006/0186151 A1 | 8/2006 | May |
| 2007/0066460 A1 | 3/2007 | Torres |
| 2008/0124991 A1 | 5/2008 | Kolarick et al. |
| 2008/0182735 A1 | 7/2008 | Thomas |
| 2008/0261786 A1 | 10/2008 | Laramore |
| 2010/0292051 A1 | 11/2010 | Benumof et al. |
| 2012/0077647 A1 | 3/2012 | Zuckerman |
| 2013/0079200 A1 | 3/2013 | Rahimi |
| 2013/0143723 A1 | 6/2013 | Bender |

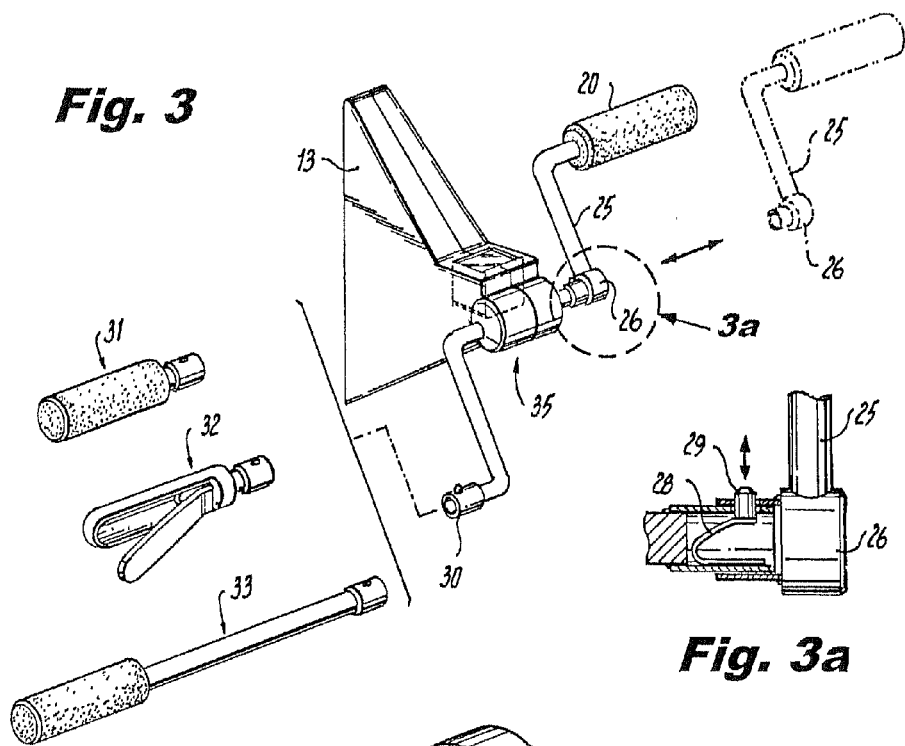
*Fig. 3*
*Fig. 3a*
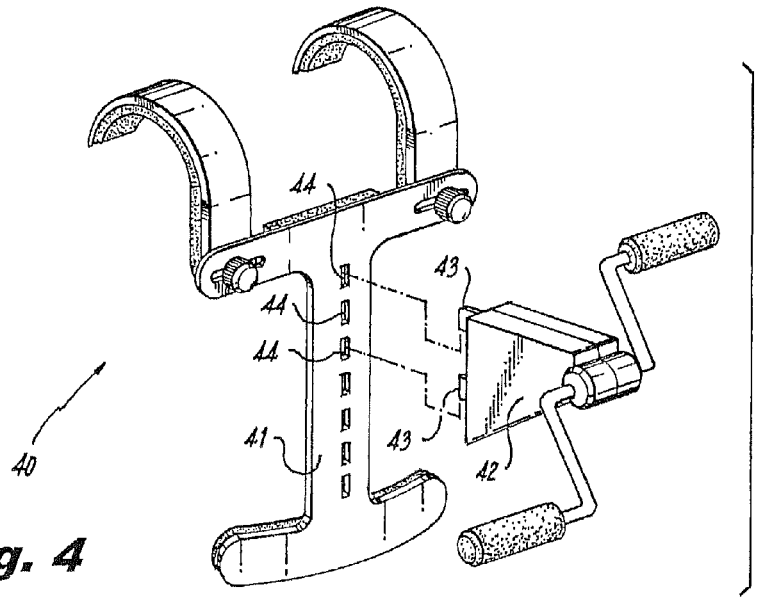
*Fig. 4*

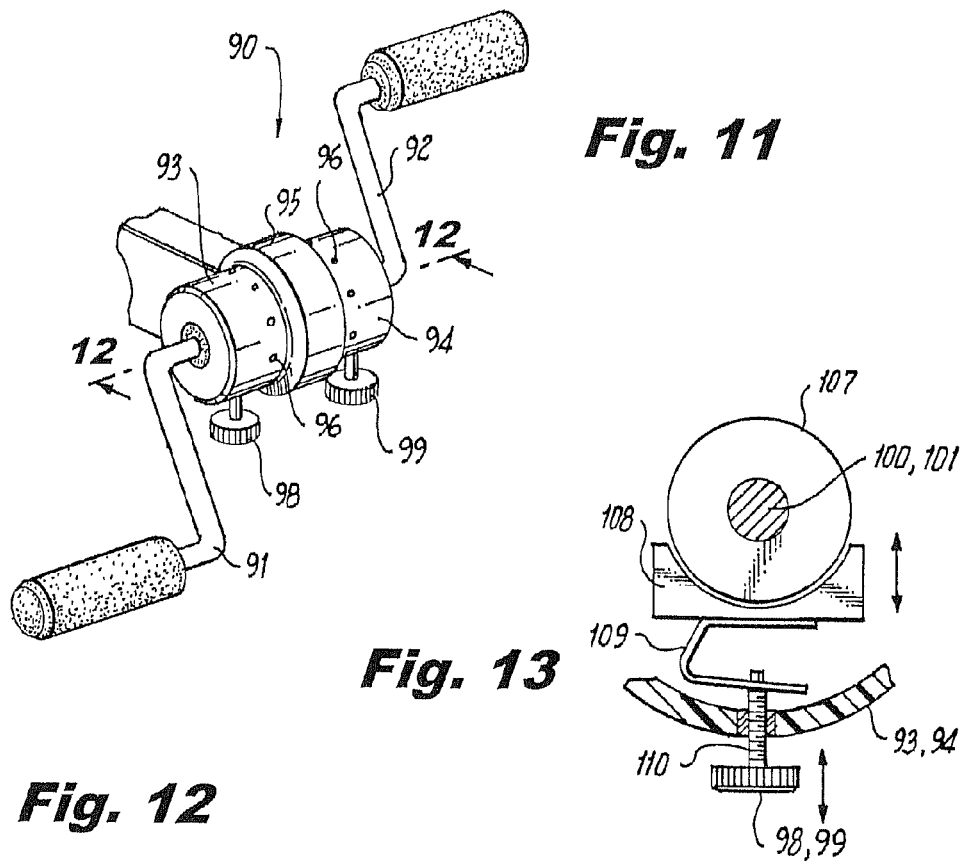
*Fig. 11*
*Fig. 13*
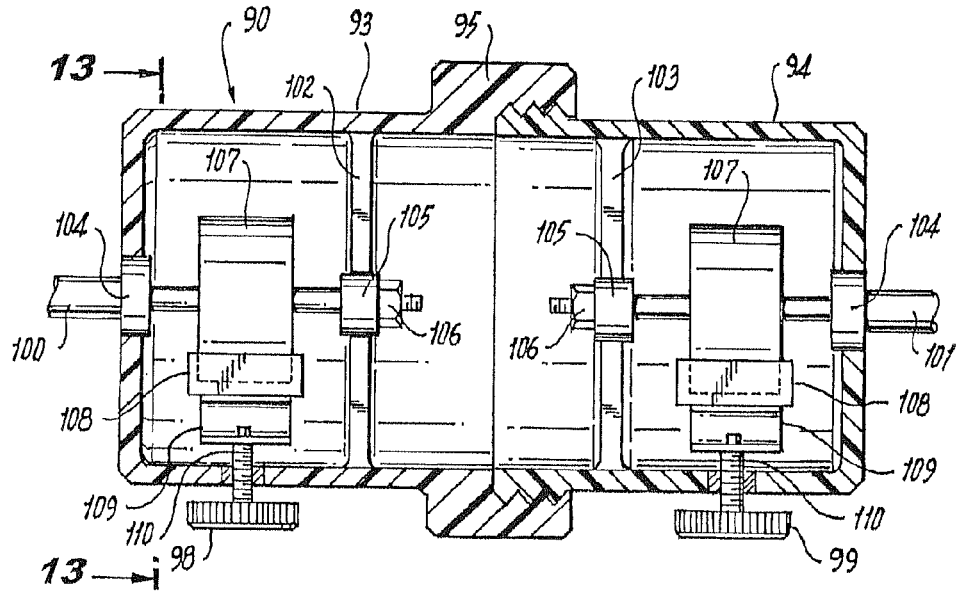
*Fig. 12*

US 9,387,354 B1

HARNESS WITH UPPER BODY EXERCISER

RELATED APPLICATIONS

This application is a continuation-in-part of application Ser. No. 14/089,541, filed Nov. 25, 2013 and claims priority under 35 USC §120 therefrom. This application is also a continuation-in-part of design application Ser. No. 29/505,232, filed Aug. 4, 2015 and claims priority under 35 USC §120 therefrom. These applications are incorporated by reference herein.

FIELD OF THE INVENTION

This invention is concerned with a portable upper body exercise harness that can be worn and used by a person while performing lower body exercise such as walking or using a treadmill.

BACKGROUND OF THE INVENTION

Non-portable arm exercise machines are disclosed in U.S. Pat. No. 2,668,709 of Boyko for a chair mounted arm exerciser, U.S. Pat. No. 4,060,241 of Hegel for a wall mounted arm exerciser, U.S. Pat. No. 3,309,084 of Simmons, also for a wall mounted arm exerciser and U.S. Pat. No. 5,580,338 of Scelta. Scelta '338 discloses a non-walking lap supported arm bike exerciser.

Portable body worn arm exercisers are disclosed in U.S. Pat. No. 5,141,223 of Block for a limb exercise harness with elastic band/cords, U.S. Pat. No. 5,328,432 of Gvoich for a belt worn arm stretch exerciser with elastic band/cords, U.S. Pat. No. 1,402,179 of Piscitelli for an arm exercise harness with elastic band/cords, U.S. Pat. No. 1,432,013 of Blake for an arm exerciser with elastic band/cords, U.S. Pat. No. 1,618,273 of Davidson for a belt and harness worn arm exerciser with elastic band/cords, U.S. Pat. No. 2,097,376 of Marshman for an exercise harness with elastic band/cords, U.S. Pat. No. 4,961,573 of Wehrell for a boxing exercise harness with elastic band/cords, and U.S. Pat. No. 5,176,377 of Wilkinson for a limb exercise harness with elastic or non-elastic band/cords.

However the elastic arm exercises with harnesses and elastic bands/cords may be dangerous if the elastic pull cords slip out of the user's hands and fly toward someone else (or the user). Also, rotatable pedals may be better exercise for the shoulders and neck, which might get strained from too much elastic pull, since the force exerted by elastic band/cords gets harder as it stretches, but the force is constant during pedaling.

U.S. Pat. No. 4,986,537 of D'Orta describes a hip-worn sidewinder exerciser with rotational crank handles which are turned by the arms at the side of the wearer. However, D'Orta does not allow the wearer to exercise the arms in front of the wearer.

U.S. Pat. No. 5,234,395 of Miller and U.S. Pat. No. 5,916,070 of Donohue both disclose arm exercisers each with an inelastic cord which is alternately pulled forward by the left and right arms in a reciprocating matter. U.S. Pat. No. 6,659,921 of Vernon describes an arm exercise harness with a resilient, stretchable or elastic cord set which is pulled by the arms of the wearer.

It is known to simulate physical activity on an exercise machine by increasing or decreasing resistance. Resistance is a "torque" quantity in units of "length times force" such as inch-pounds or foot-pounds. Watts is a power term like horsepower: power=torque times rotational speed. One relationship is torque in inch pounds=(HORSEPOWER×63,025)/RPM. Another relation is 1 Watt=44.2537 foot-pounds/minute. A kilogram calorie (physiological type) is a unit of heat or energy akin to a Watt-second. For example, 1 kg calorie=1.162 watt-hours and is derived by integrating Watts over time.

To calibrate or manipulate "resistance" in terms of Watts, one must know both the torque and the speed simultaneously. So a unit that sets "resistance" to expend energy at a certain rate of power in Watts, one determines a measure of the torque and a measure of rotational speed (such as RPM) which is usually derived from a speed sensor such as a digital encoder (or a conventional tachometer).

U.S. Pat. No. 7,727,125 of Day describes a foot pedal exercise device with a servo controller controlling brake resistance to simulate harder exercise. The method used in Day '125 or similar stationary powered exercise gym machine in a gym or rehab venue with utility supplied electric power may not be feasible for a portable walk-around unit because of power limitations. For example, if a brake drum and pad are forced together directly by an electromagnetic linear actuator, it would be too power-hungry. However, a motor and lead screw works well just using a small battery for a portable unit.

OBJECTS OF THE INVENTION

It is therefore an object of the present invention to provide an upper body exercise harness that can be worn and used by a person while performing lower body exercise such as walking or using a treadmill.

It is also an object of the present invention to provide an arm exerciser which can be used in front of the chest of the user while walking or using a treadmill, which utilizes rotational pedals and which promotes the well being of the user.

It is yet another object of the present invention to provide a smooth exercise force which can be optionally adjusted in the amount of force exerted.

It is yet another object of the present invention to provide an easily worn exercise device is which encourages the user to exercise without complicated assembly.

It is a further object of the present invention to provide an upper body exerciser which is comfortable to wear while walking.

It is yet another object to provide a portable upper body exerciser which evenly distributes weight between the shoulders, mid back and waist/low back.

Other objects which become apparent from the following description of the present invention.

SUMMARY OF THE INVENTION

While the prior art does address some limited types of upper body exercise that is compatible with walking or using a treadmill, this invention permits vigorous upper body exercise involving hands, arms, biceps, triceps, shoulders, and neck. The present invention is a harness that rests on the shoulders and/or thoracic and/or waist/lumbar back regions of a person with a forward extension, presenting a crank set with handgrips at the distal ends of a hand crank, that can be rotated, such as how bicycle pedals are rotated by the feet. The handgrips can be horizontally oriented on either side of the crank, or can be U-shaped and pivotable from a horizontal orientation to a vertical orientation, to exercise different hand and arm muscles. Since the harness is easily donned or removed with just a single lifting motion or by releasing and opening backpack type straps, its convenience encourages frequent use.

In the first most basic embodiment, the present invention comprises two arcuate harness loops that fit over the shoulders, a chassis plate that connects the two harness loops at the top to a lower horizontal section that rests against the waist region, and a forward extension attached to the central vertical portion of the chassis plate. The forward extension carries bearings that locate the hand crank mechanism. All body contact areas of the invention are padded with a layer of resilient foam for comfort. The forward extension also houses an electronic monitor of biological metrics and time/distance with a display visible at the top.

In the second embodiment of the present invention, two features are added. The cranks are removable from the shaft so that by the use of two spring latches either one or both can be used. This is of advantage if the person using the upper body exerciser has had an injury to one arm or hand or is indeed an amputee. A freely rotating handgrip may be distracting. Another feature is that the handgrip itself may be removed from the crank or exchanged using spring latches at the distal ends of the crank. A variety of handgrips may be engaged, such as a basic handgrip, a hand-exercising spring handgrip, or a handgrip at the end of a longer shaft to more efficiently exercise shoulder muscles.

In the third embodiment of the invention, the vertical center section of the chassis plate is perforated at set intervals to permit a vertical adjustment of the forward extension which has two downward opening hooks facing back which are in registration with the perforations. The desired height is selected by choosing the appropriate pair of perforations to mate with the hooks.

In a fourth embodiment a bar with a series of holes is engaged forward of the chassis plate. The forward extension is modified to engage the bar and lock into a pair of holes on the bar at a desired location forward of the chassis plate offering variable forward placement for the crank set. The bar itself has three selectable positions of engagement with the chassis plate so that the crank set can be located grossly in the vertical direction and more finely in the horizontal direction.

In a fifth embodiment, an L-shaped bar is engageable with the chassis plate at three vertical positions (as in the fourth embodiment). The L-shaped bar with one side horizontal and one vertical (pointing upwards) has a series of holes along both legs. The forward extension as modified for the fourth embodiment can be engaged with any pair of adjacent holes on either the horizontal or vertical legs of the L-shaped bar affording great positional variability of the crank set in small increments.

In the sixth embodiment, a ball joint with lock clamp is attached to the vertical central section of the chassis plate. Attached to the ball of the ball joint is a telescoping rod with adjustment lock carrying the crank set at its distal end. This arrangement permits great continuous variability in location of the crank set.

A seventh embodiment of the present invention is a crank set with separate crank shafts permitting any circumferential relationship in the relative positions of each crank. In fact, one crank can be rotated clockwise while the other is rotated counterclockwise. The more important feature that this flexibility permits is the addition of two separate rotational friction adjustments, one for each crank side or handgrip. This is an important feature especially for upper body exercise in rehabilitation from injury to one side or the other, or to compensate for atrophy or weakness in one side or the other. Inside the central housing of the crank set are two separate brake drums and friction pads with external adjusting knobs to permit separate friction adjustments for each side.

In an eighth embodiment, a arcuate, polygonal or linear forward extension member is optionally provided, so that the hand crank can be positioned anywhere along the arc or edge surface(s) of the forward extension member.

In a ninth embodiment, the portable upper body exerciser is supported by backpack type straps, which go over the shoulders and connect to a waist area in the rear lumbar region of the user, thereby distributing the weight of the portable upper body exerciser evenly in the shoulder, mid back thoracic region and in the waist rear lumbar area. Instead of being lifted upward from the shoulders as in the first through eighth embodiments, the portable upper body exerciser is released by openable fasteners attached to the backpack type straps.

In tenth and eleventh embodiments, the frame of the portable upper body exerciser is adjustable so that the forward extension member with the crank set is floor mounted upon removal of the shoulder loops or back straps, and optionally the chest and abdominal support plates, whereby the pedal cranks are foot operable, not hand operable, and the handgrips are replaced by foot pedals.

BRIEF DESCRIPTION OF THE DRAWINGS

The present invention can best be understood in connection with the accompanying drawings. It is noted that the invention is not limited to the precise embodiments shown in drawings, in which:

FIG. 3 is an exploded view of the parts of the crank set of the second embodiment of this invention showing a detachable crank as well as three variations of detachable handgrips;

FIG. 3a is a side elevation detail in partial cross section of the spring detachment latch mechanism used in FIG. 3;

FIG. 4 is a perspective exploded view of third embodiment of this invention showing a vertically adjustable attachment of the crank set relative to the harness chassis;

FIG. 11 is perspective view of the seventh embodiment of this invention comprising a crank set affording separate adjustment of frictional resistance for each side;

FIG. 12 is a side view in partial cross section showing the internal parts comprising the features of the seventh embodiment of this invention;

FIG. 13 is an end view of a brake drum, friction pad, leaf spring, friction screw, and knob all used in the seventh embodiment;

DETAILED DESCRIPTION OF THE INVENTION

The present invention is described below in optional alternate embodiments, which can be varied. For illustrative purposes only, preferred modes for carrying out the invention are described herein.

Figure 1:
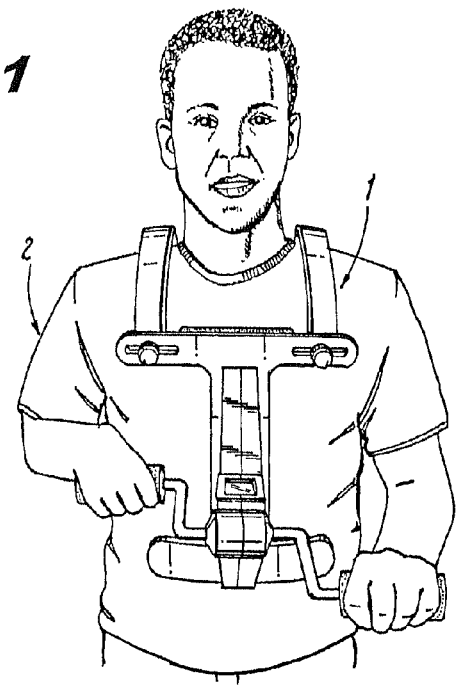
FIG. 1 is a perspective view of the harness with upper body exerciser of this invention in use by a person.
Figure 2:
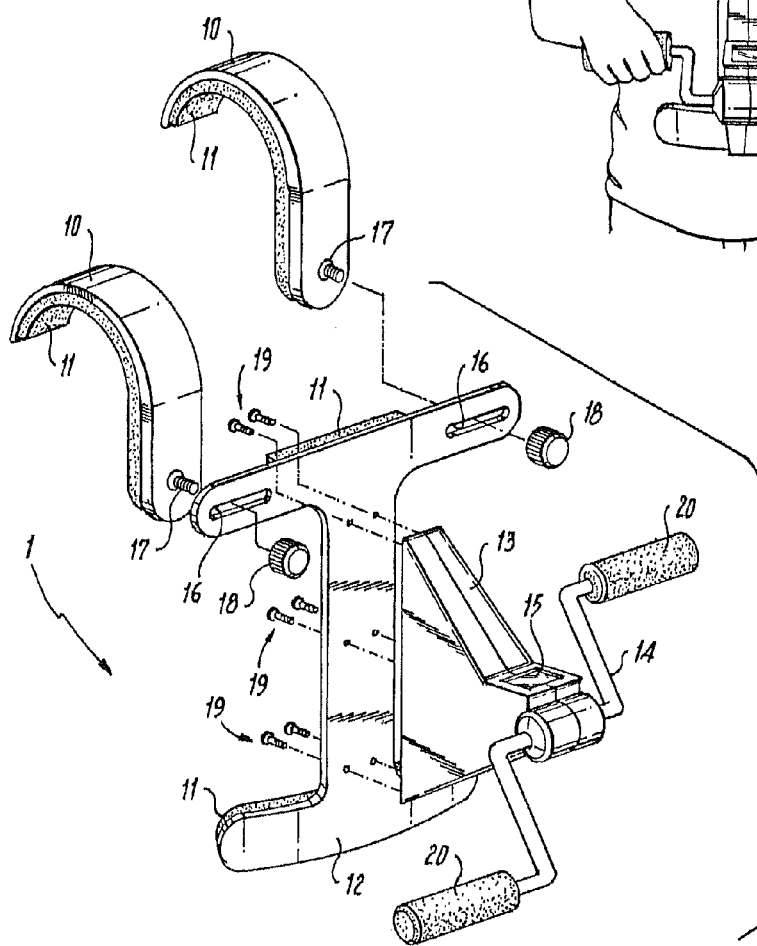
FIG. 2 is a perspective exploded view of the parts comprising the harness of FIG. 1.

FIGS. 1 and 2 relate to the first embodiment 1 of the harness with upper body exerciser of this invention; a person 2 using harness 1 is shown in FIG. 1. FIG. 2 is an exploded view of harness 1 with harness chassis plate 12 with harness loop attachment slots 16 at the top horizontal section, a middle vertical section below and a lower end horizontal section that rests approximately at waist level on the user. Harness loops 10 have attached studs 17 which engage attachment/adjustment knobs 18 through slots 16. Forward section 13 is a member which locates crank set 14 and attaches to harness chassis plate 12 via six screws 19. Handgrips 20 are at the distal ends of crank set 14. Note that all surfaces which touch the user preferably have an attached cushioned layer, such as, for example, of resilient foam 11. Display 15 of an electronic monitoring and information module is visible at the top of forward section 13.

FIG. 3 shows the parts involved with the optional detachable crank and handgrips of the second embodiment which are incorporated into modified crank set 35. These modifications are quick disconnect latches 26 which can detach a crank 25 from the shaft and 30 which is used to make the handgrips 20 removable. Three different types of detachable handgrips are shown, 31 is a normal handgrip, 32 is a hand exercising grip which is squeezed repeatedly, 33 is a normal handgrip attached to a wider shaft to spread the grips apart horizontally. It can be wider lengthwise by having a longer shaft, or it can be telescopically wider. FIG. 3a is a detail showing the internal leaf spring 28 and engagement button 29 of latch 26. A similar mechanism is used in latches 30 for the handgrips.

FIG. 4 shows the third embodiment 40 of harness showing harness chassis plate 41 a vertical adjustment sub-assembly, such as, for example, a plate 41 with rectangular holes 44 which can engage hooks 43 on forward section 42 to vary the vertical position of the crank set.

Figure 5:
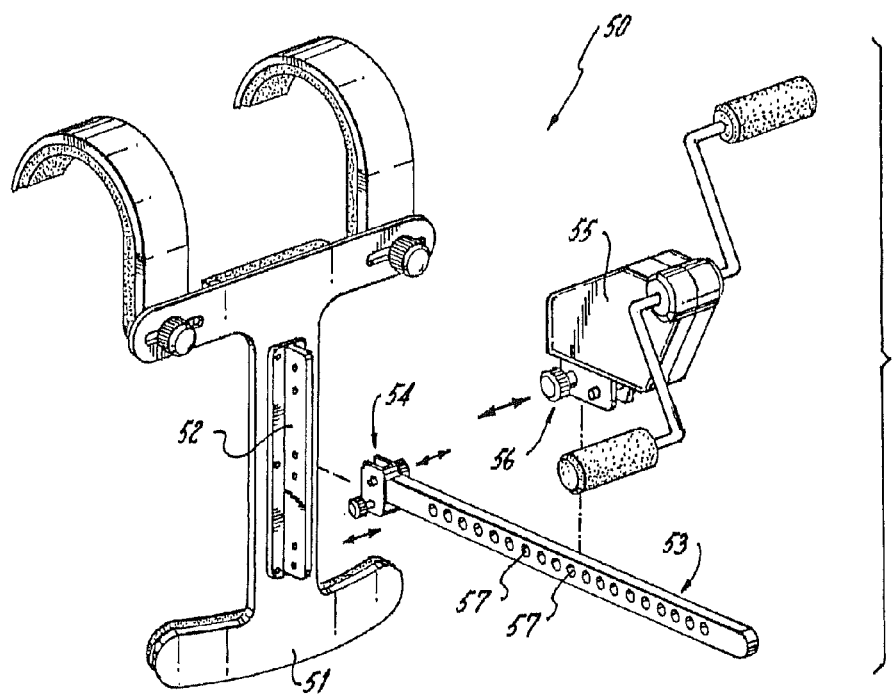
FIG. 5 is a perspective exploded view of the fourth embodiment of this invention using a bar with a series of holes to permit more horizontal adjustment of the crank set.
Figure 6:
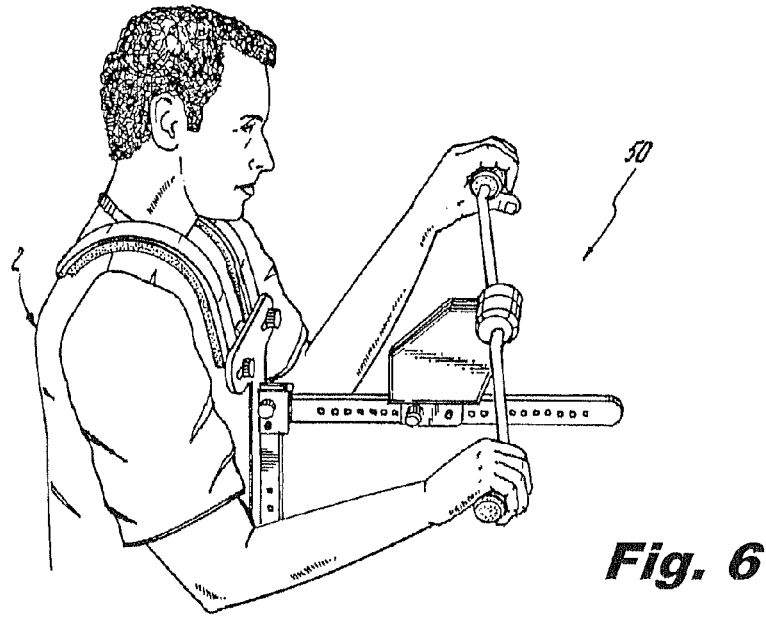
FIG. 6 is a side perspective view of the fourth embodiment of the invention in use by a person.

FIGS. 5 and 6 show the fourth embodiment 50 with a horizontal adjustment sub-assembly, including, for example, a harness utilizing bar 53 such as, for example, a series of holes 57. Bar 53 can engage bracket 52 mounted to harness chassis plate 51 in any of three vertical locations (at double holes) via double spring pins 54 located at the proximal end. Detachable modified forward section 55 with double spring pin plate 56 can engage any pair of adjacent holes 57. Therefore the horizontal position of the crank set can be varied in small increments while the vertical position can be set at three different levels. FIG. 6 shows a person 2 using harness 50.

Figure 7:
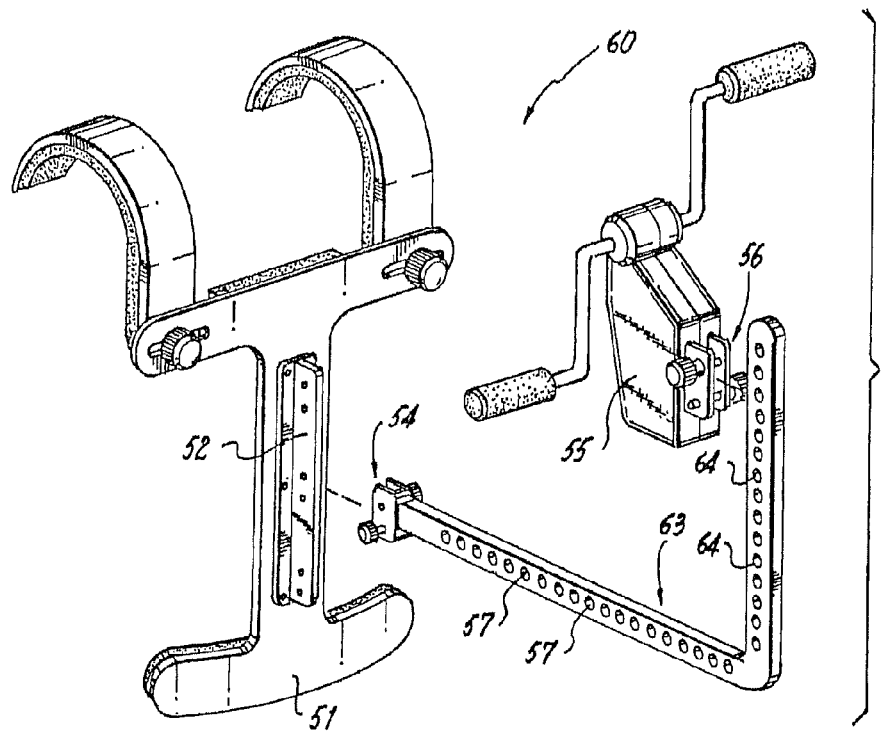
FIG. 7 is a perspective exploded view of the parts of the fifth embodiment of this invention using an L-shaped bar to offer placement variations of the crank set in both the horizontal and vertical directions in small increments.
Figure 8:
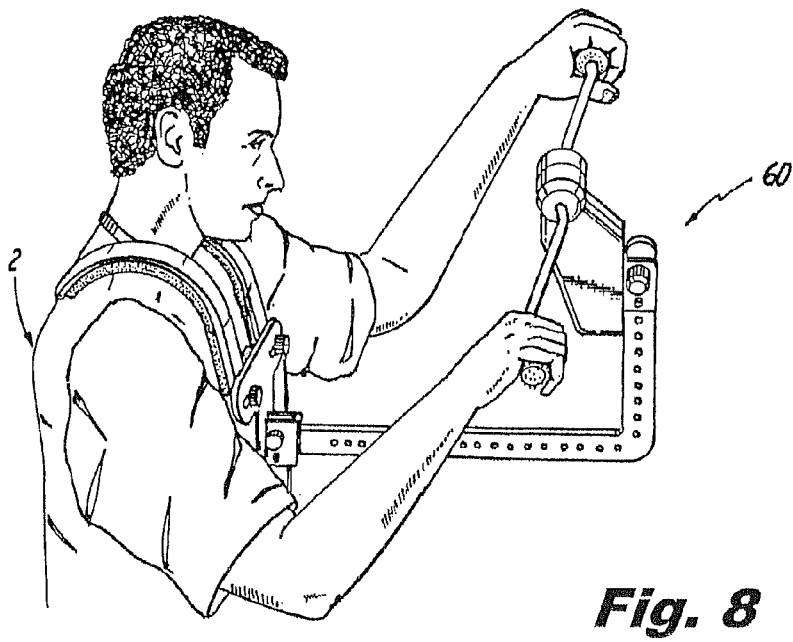
FIG. 8 is a side perspective view of the fifth embodiment of this invention in use by a person.

FIG. 7 shows the fifth embodiment 60 of upper body exercise harness with a further optional adjustment sub-assembly, such as, for example, which uses an L-shaped bar 63 with holes 57 along the horizontal section and holes 64 along the vertical portion. Forward section 55 can be positioned anywhere along either the horizontal section (holes 57) or the vertical section (holes 64) of L-shaped bar 63. If attached to the horizontal section it can be positioned in a manner similar to that of the forth embodiment as in FIG. 5. However, when attached to an adjacent pair of holes on the vertical section, the crank set can be adjusted in small increments vertically at the distal horizontal limit of bar 63. FIG. 8 shows person 2 using exercise harness 60.

Figure 9:
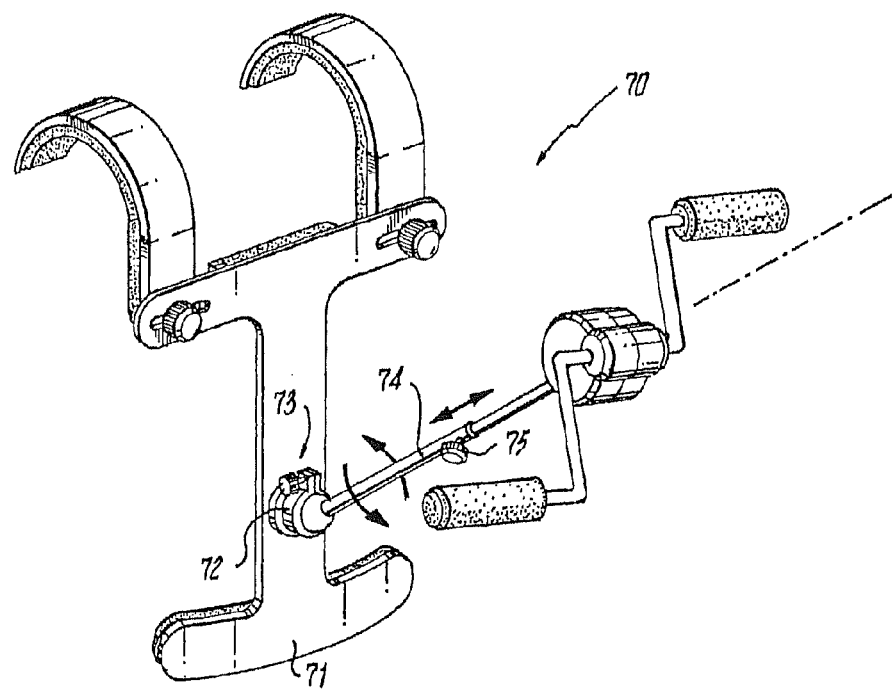
FIG. 9 is a perspective view of the sixth embodiment of this invention using a ball joint and telescoping rod to be able to locate the crank set rapidly and smoothly in a desired space in front of the harness chassis.

FIG. 9 shows the sixth embodiment 70 of exercise harness of this invention. In this embodiment, quick smooth locating of the crank set in a forward region is achieved via harness chassis plate 71 with a locking telescopic sub-assembly, such as, for example, an attached ball joint 72 with locking collar 73 combined with ball connected telescoping rod 74 with lock knob 75.

Figure 10:
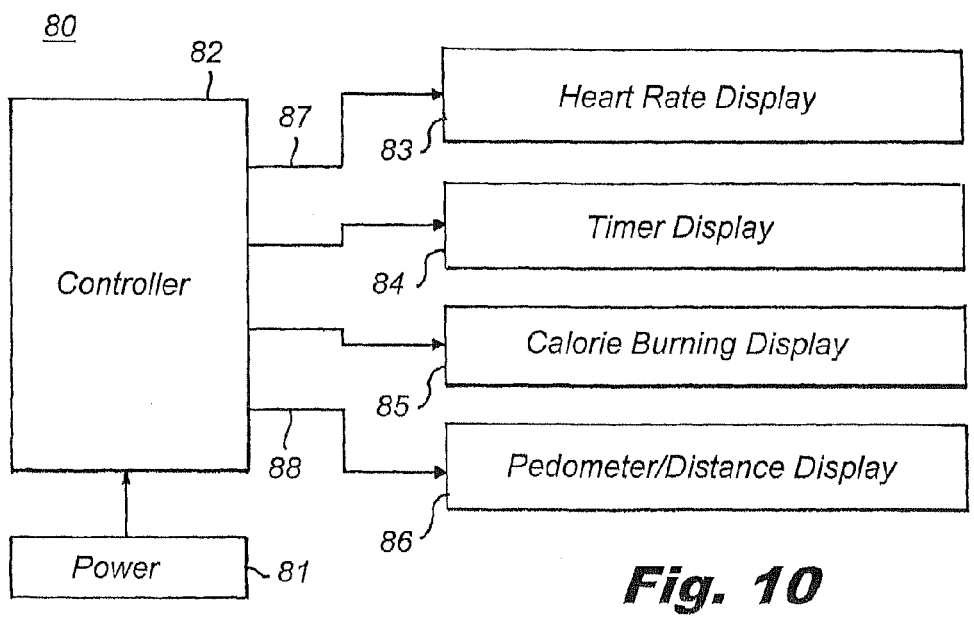
FIG. 10 is a high level block diagram of an electronic monitoring system of this invention.
Figure 14:
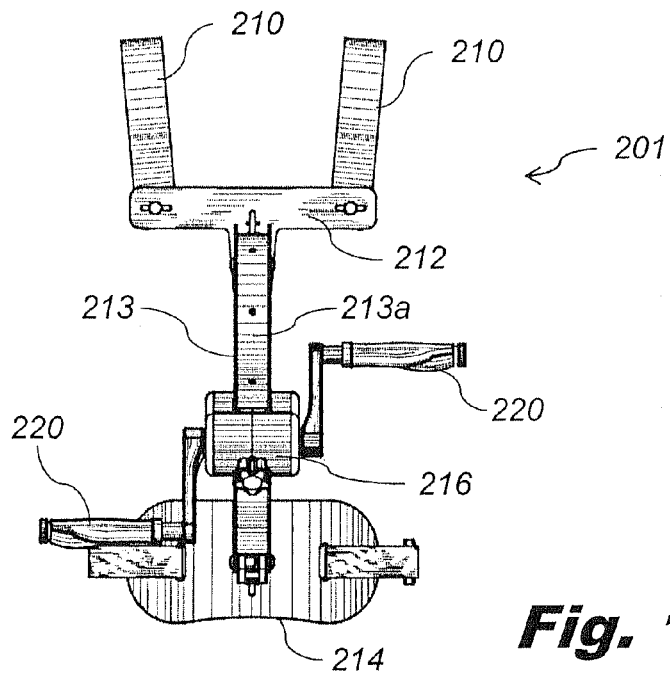
FIG. 14 is a front elevation view of an alternate embodiment for a portable upper body exerciser.
Figure 15:
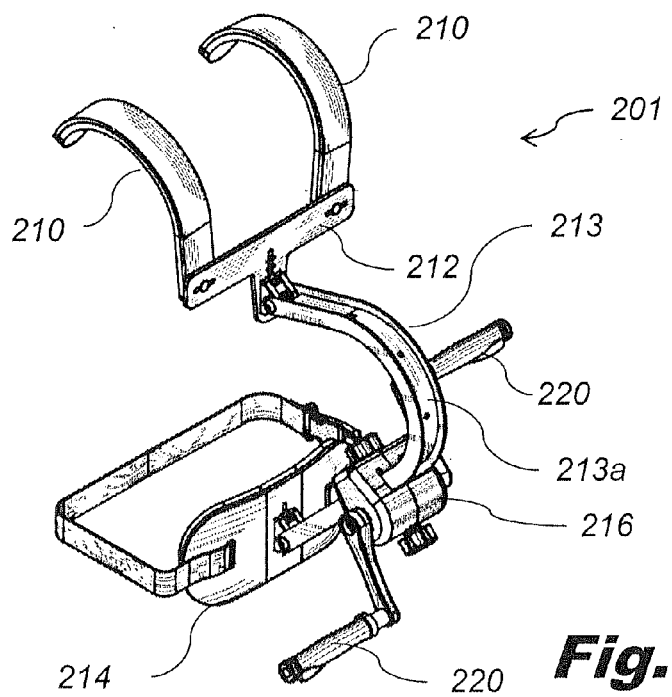
FIG. 15 is a perspective view of the portable upper body exerciser shown in FIG. 15.
Figure 16:
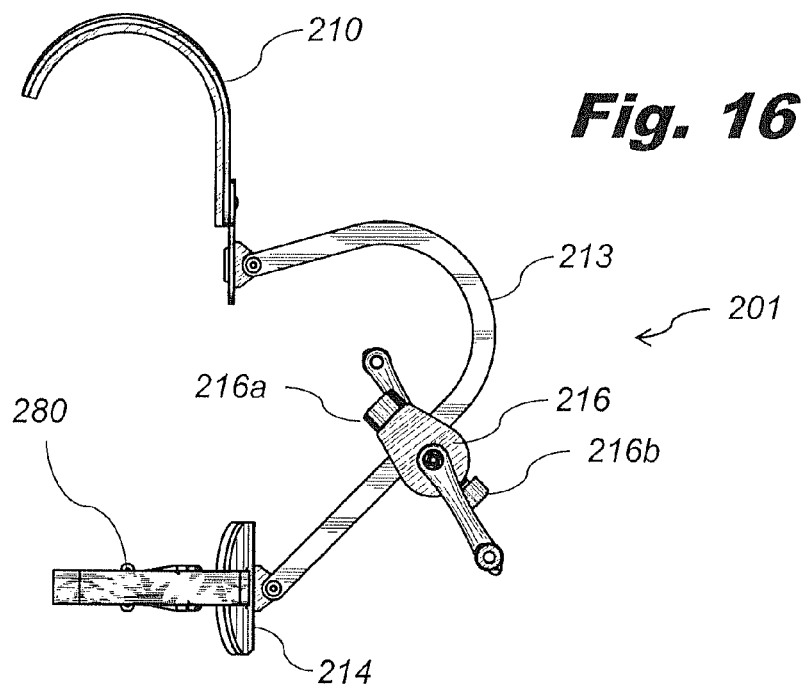
FIG. 16 is a left side elevation view thereof, showing the exercise crank located in one position during rotational movement.
Figure 17:
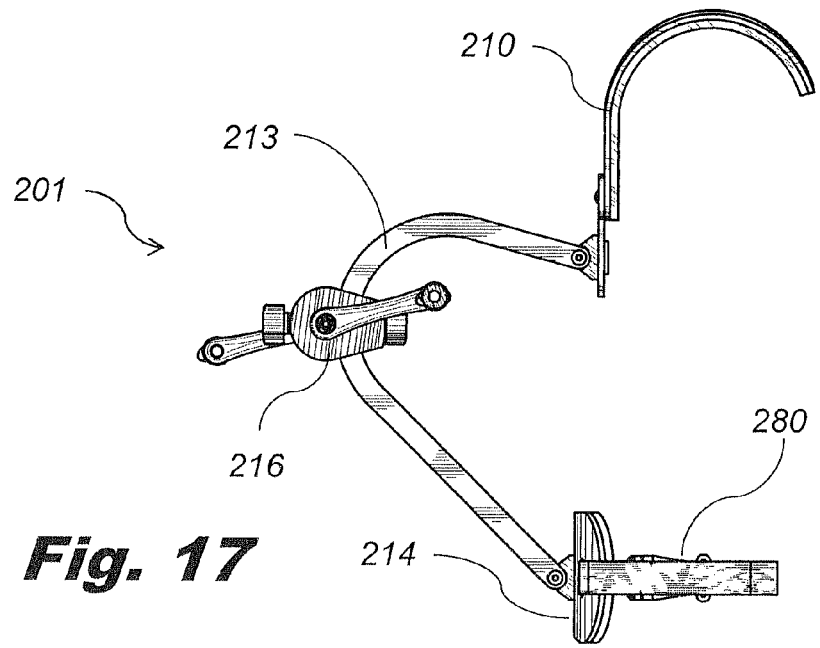
FIG. 17 is a right side elevation view of the portable upper body exerciser shown in FIG. 16 showing the exercise mechanism located in another position during rotational movement.
Figure 18:
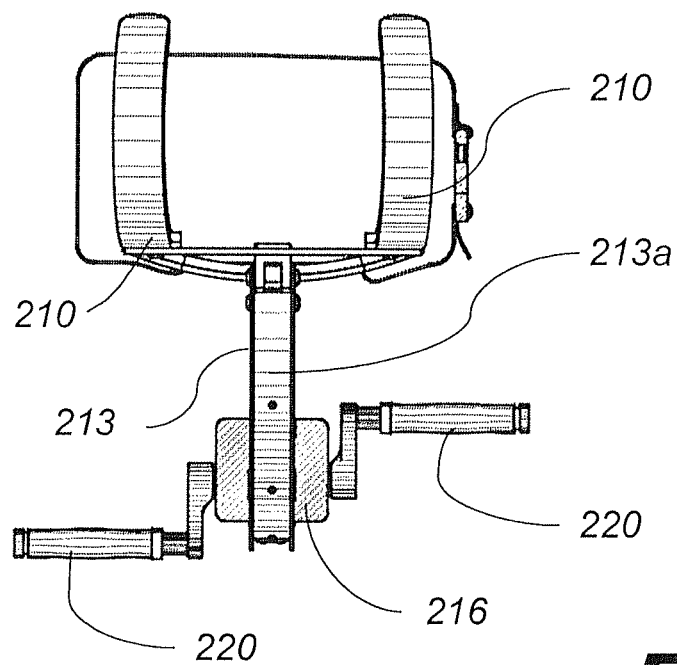
FIG. 18 is a top plan view thereof.

FIG. 10 is a high level block diagram of the optional electronic monitoring system of this invention, with power source 81 in the form of a battery pack supplying power to controller 82 and wire-attached pedometer display 86, and heart rate monitor which is displayed at 83. Also displayed are timer 84 and calorie burning estimate display 85. Wires 87 and 88 to the person-attached sensors can be replaced by a Bluetooth wireless link. In fact, the entire electronic system can be replaced by a smart cell phone using downloadable application software (i.e.—an "app") with Bluetooth links. In that case, monitor screen 15 of FIGS. 1 and 2 would be replaced by a bracket to hold the smart phone in a screen-readable attitude.

FIGS. 14-18 relate to the eighth embodiment 201 of the harness with upper body exerciser of this invention, with upper harness chassis plate 212 with harness loop attachments 210 at the top of harness chassis plate 212. A forward extension member 213 extends outward between upper harness chassis plate 212 and lower harness plate 214, which is located approximately at waist level on the user. Forward extension member 213 is preferably arcuate, as shown in FIGS. 14-18, but may have other geometric configurations, such as triangular in FIG. 2, polygonal, as in FIG. 5 or 6, or linear as in FIG. 9. Forward extension member 213 includes a crank set (not shown) such as crank set 216 of 216 (not shown) positionably movable and lockable in place anywhere along an optional track 213a of optionally arcuate forward extension 213, or along any outer surface or forward extension member 213. While forward extension member 213 is shown in FIGS. 14-18 as going inside of crank 216, and adjusted in place by locking member 216a, such as, for example, a knob, so that crank set 216 moves over optional track 213a of forward extension member 213, other configurations for positionally moving crank set 21b to a desired location along outside surface(s) of forward extension member 213 can apply.

Crank set 216 can also have one or more optional tensioning members 216b, similar to tension members 98 and/or 99 of crank set 90 of FIG. 12. Harness loops 216 support portable upper body exerciser 201 upon the shoulders of the user. Forward extension member section 213 is a member which locates crank set 214 and attaches to upper and lower harness chassis plates 212 and 214. Handgrips 220 are at the distal ends of crank set 216.

Handgrips 220 as being tubular in FIGS. 14-18, but they can have other configurations known to those skilled in the art, such as being U-shaped and pivotable in orientation from horizontal to vertical, and back.

Also, crank set 216 is lockable by locking member 216a, in place, anywhere along the outside or inside surface of forward extension member 213, which may be a track 213a with an internal channel, such as shown in FIGS. 14-18, or may be a track with an exterior protruding track configuration (not shown), or along a set of discrete holes 57, such as shown along rod 53 of FIGS. 5 and 6.

Note that all surfaces which touch the user preferably have an attached cushioned layer, such as, for example, of resilient foam. An optional visual display, such as display 15 of an electronic monitoring and information module shown in FIGS. 1-2 or of FIG. 10, may be visible at the top of forward section 213.

Handgrips 220 may be optionally detachable from crank 216.

As noted above, crank set 216 is detachably movable anywhere along the surface or surfaces of forward section 213, whether arcuate, polygonal or linear in shape, for the convenience of the user.

Figure 19:
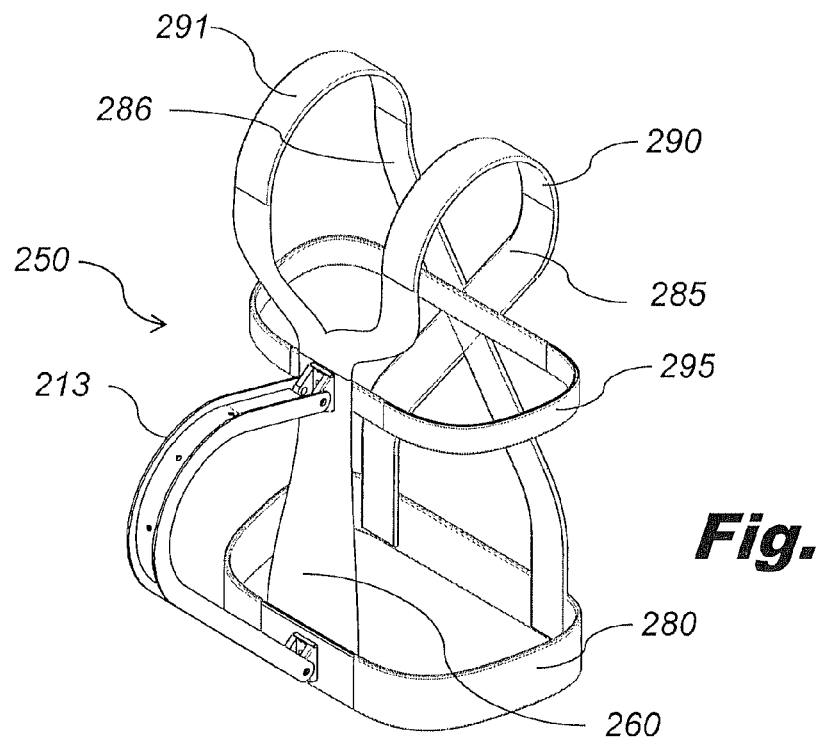
FIG. 19 is a perspective view of a further alternate embodiment for a portable upper body exerciser, shown with backpack type straps.
Figure 20:
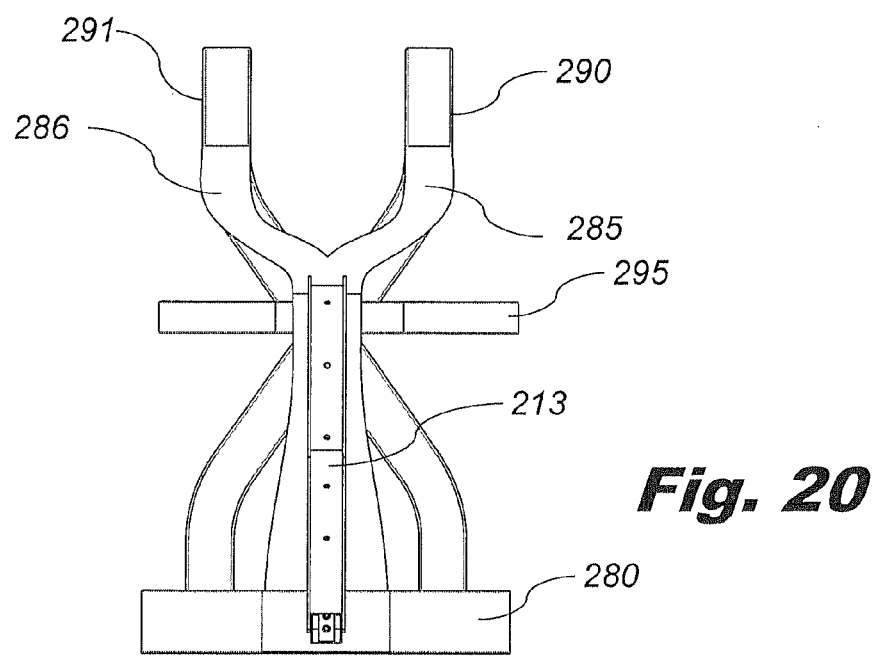
FIG. 20 is a front view of the portable upper body exerciser shown in FIG. 19.
Figure 21:
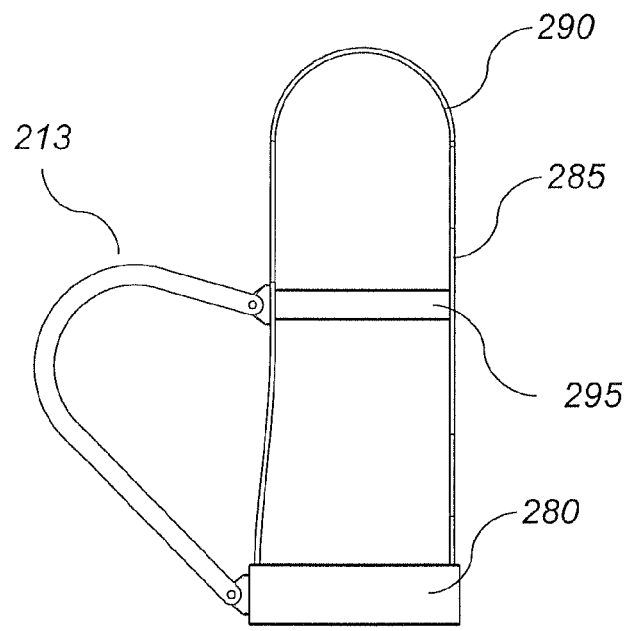
FIG. 21 is a right side elevation view thereof.
Figure 22:
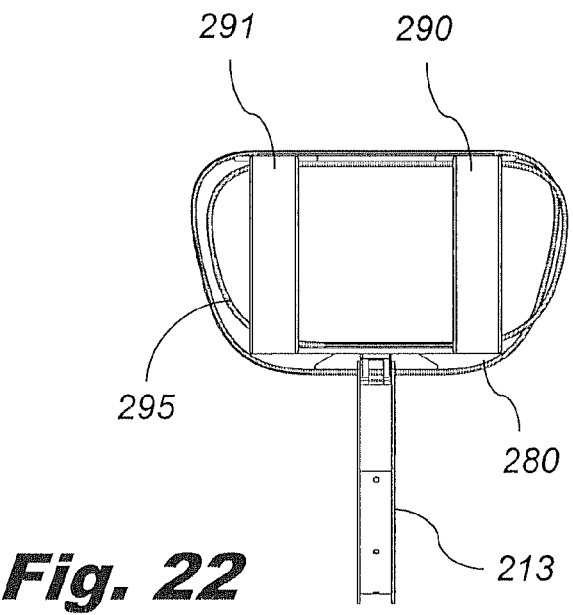
FIG. 22 is a top plan view thereof.

FIGS. 19 and 20 show the ninth embodiment 250 with optional backpack straps 260 supporting portable upper body exerciser 250 evenly on the shoulders, mid back and waist of the user. Portable upper body exerciser 250 is shown without crank set 216 and handgrips 220.

FIG. 19 shows optional flexible front chest plate 260 (which may be of a flexible, bendable metal, plastic or canvas or other fabric material) extending between the upper and lower ends of arcuate forward section 213. The lower end of flexible plate 260 is attached to lower harness abdominal waist belt 280, above which extend one or more flexible backpack type straps 285, 286, etc., which optionally have structured, reinforced shoulder loops 290, 291 integrally connected thereto. Upper harness chest belt 295 optionally connects front flexible chest plate 260 to straps 285, 286, which have conventional fastener buckle clasps (not shown). In a further embodiment, forward extension member 213 can be attached at its upper end by a fastener plate or region to upper harness chest belt 295, and at its lower end to lower harness abdominal waist belt 280, without the optional flexible front chest plate 260.

Figure 23:
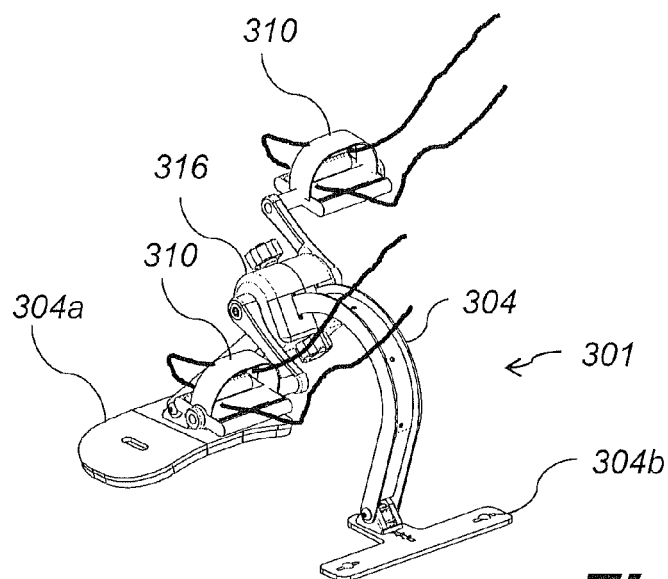
FIG. 23 is a perspective view of a further alternate embodiment of a portable foot operable leg exerciser, where the user's feet are shown in silhouette.
Figure 23A:
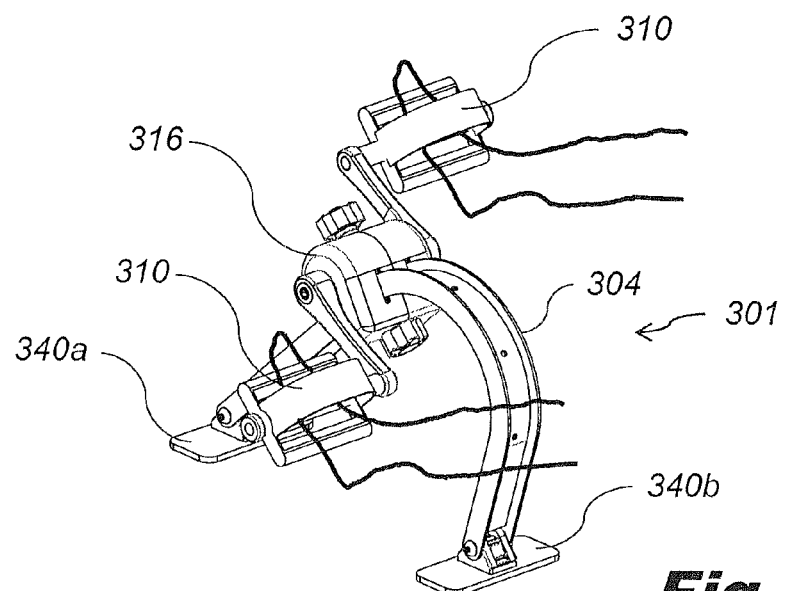
FIG. 23A is a perspective view of a second further alternate embodiment of a portable foot operable leg exerciser, where the user's feet are shown in silhouette; and, FIG. 23B is a right side elevation view of the portable foot operable leg exerciser, as shown in FIG. 23A.
Figure 23B:
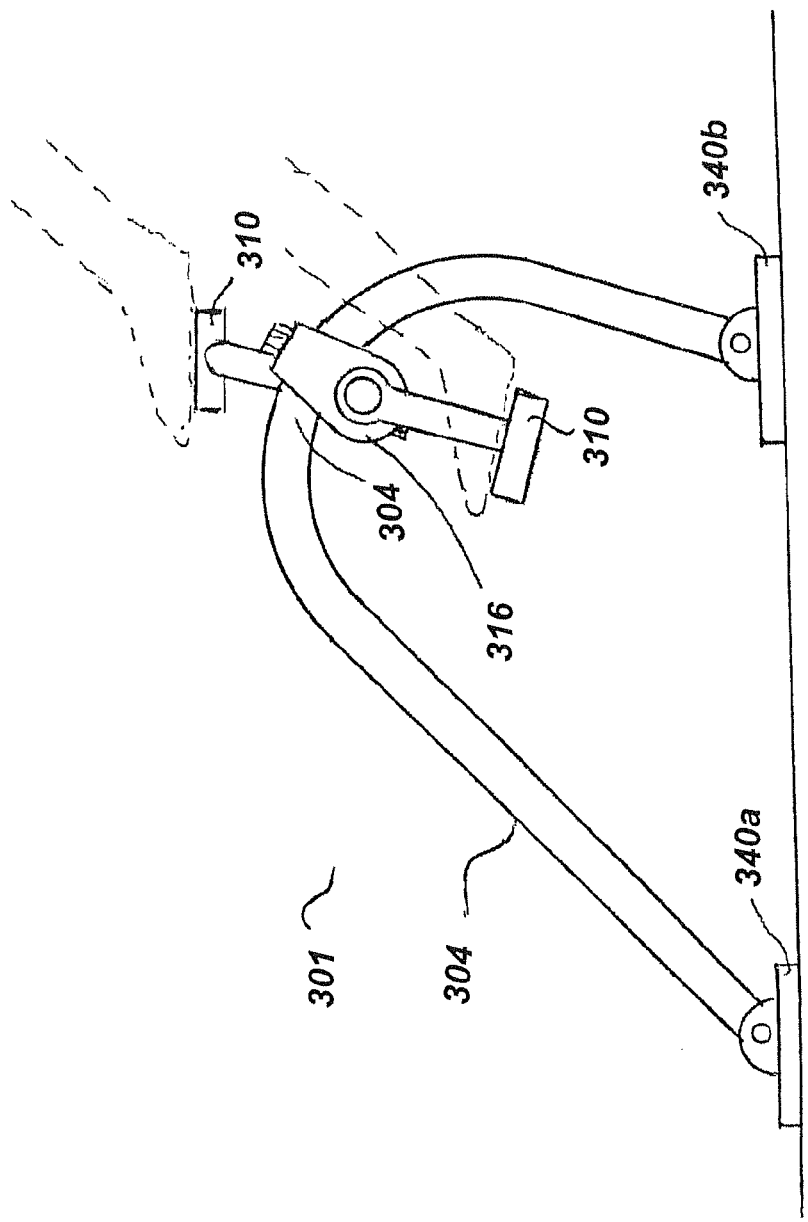

FIGS. 23, 23A and 23B shows the tenth and eleventh embodiments 301 of the exercise harness of this invention, where the harness is adapted to be also floor mounted so that the arm pedals are replaced with foot operable pedals 310. In FIG. 23, the upper chest belt 295 and lower waist belt 280 are respectively removed from upper and lower plates 212, 214 shown in FIG. 19-22, so that the upper plate 212 and the lower plate 214 act as floor mountable bases for placement and stability of the exercise harness 301 on the floor. In FIGS. 23A and 23B, the upper and lower plates 212, 214 of FIGS. 14-18 are optionally removable, also for set up of forward extension member 304 on the floor. The crank set 316 is mounted on the preferably arcuate forward extension member 304, and the arcuate forward extension 304 has attachable opposite base ends 340a, 340b, removably mountable upon a horizontal floor. The crank set 316 is movably positioned along the forward section track member 301 with the foot pedals 310, which are adapted to be rotatably cycled by the feet of the user for a lower body exercise.

In addition to the embodiments shown in FIGS. 1-10, it is noted that the alternate embodiments of FIGS. 14-18, 19-22 and 23, can have the optional electronic monitoring systems of FIG. 1, 2 or 10 with power source 81 in the form of a battery pack supplying power to controller 82 and wire-attached pedometer display 86, and heart rate monitor which is displayed at 83. Also displayed are timer 84 and calorie burning estimate display 85. Wires 87 and 88 to the person-attached sensors can be replaced by a Bluetooth wireless link. In fact, the entire electronic system can be replaced by a smart cell phone using downloadable application software (i.e.—an "app") with Bluetooth links. In that case, monitor screen 15 of FIGS. 1 and 2 would be replaced by a bracket to hold the smart phone in a screen-readable attitude.

In addition to the embodiments shown in FIGS. 1-10, it is also noted that the alternate embodiments of FIGS. 14-18, 19-22 and 23, can also optionally have the modified crank set 90 of FIGS. 11-13 for optional independent pedal resistance, wherein left crank 91 and right crank 92 are not connected by a single shaft. They each have their separate half-shafts 100 and 101 respectively as seen in FIG. 12. Adjusting knobs 98 and 99 are used to adjust the desired frictional load of the left crank and right crank respectively. Left housing 93 screws into right housing 94 via screw collar 95. Internal support disks 102 and 103 are attached to respective housing sections 93 and 94 via screws 96. Crank half-shafts 100 and 101 are supported by outer bearings 104 and internal bearings 105 and locked in place laterally by nuts 106. Each half-shaft has an attached brake drum 107 which is used to adjust the friction load independently. Brake pad blocks 108 with attached leaf spring 109 are forced against their respective brake drum via screws 110 through threaded holes in chassis sides with left and right external knobs 98 and 99 respectively.

Also in addition to the embodiments shown in FIGS. 1-13, it is further noted that cranks 214 of the alternate embodiments of FIGS. 14-19, 20-22 and 23 may have a similar resistance adjustment mechanism. The shaft optionally has an attached brake drum which is also used to manually adjust friction load for the respective pedals with handgrips 20. Similar to the mechanism shown in FIG. 13, a brake pad block similar to brake pad blocks 108 with attached leaf spring 109 is forced against a brake drum similar to brake drum 107. It is further noted that either crank half shafts 100 and 101 of FIGS. 11-13 or a full crank 14 of FIGS. 1-3, or its positionally adjusted related embodiments shown in FIGS. 4-9, may also control resistance with a servo-control communicating with display window screen 15, also optionally for the embodiments of FIGS. 14-19, 20-22 and 23, whereby resistance is elevated up or down by incrementally pushing a button or touch screen button region up or down, such as for example, to raise or lower the resistance measured in increments of a defined wattage, such as 10 watts, for example, in either direction up or down to increase or decrease resistance of the rotating pedals.

In the foregoing description, certain terms and visual depictions are used to illustrate the preferred embodiment. However no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A portable upper body exercise harness comprising:
   one or more backpack straps adapted to be worn over shoulders, mid back and abdominal waist of a user;
   a harness chassis plate supported by forward ends of said straps adapted to rest on the chest of said user, free rearward ends of said backpack straps being attached to a waist belt, thereby allowing said exercise harness to be readily mounted on and removed from said user;
   a crank set mounted on a forward extension member from said chassis plate, said forward extension member having a forward section track member; and
   said crank set movably positioned on said forward section track member having crank arms adapted to be rotatably cycled by the hands of the user for an upper body exercise while engaging in a lower body exercise.

2. The portable upper body exercises harness as in claim 1 wherein a lower portion of said forward extension member is attached to said waist belt.

3. The portable upper body exercise harness as in claim 1 wherein said forward extension member is arcuate.

4. The portable upper body exercise harness as in claim 1 wherein said forward extension member is polygonal.

5. The portable upper body exercise harness as in claim 1 wherein said forward extension member is linear.

6. The portable upper body exercise harness of claim 1 further comprising a means for adjusting frictional load and resistance adjustment on said crank set.

7. The portable upper body exercise harness of claim 6 in which said means for adjusting frictional load and resistance adjustment comprises a brake drum and brake pad block with an adjustable leaf spring for selecting desirable frictional loading and resistance adjustment on said crank set.

8. The portable upper body exercise harness of claim 1 in which said crank set comprises left and right cranks, each crank having independent shafts extending into a housing, and means for separately adjusting frictional load and resistance adjustment on each of said cranks.

9. The portable upper body exercise harness as in claim 1 further comprising said forward section member having a screen visible to said user, said forward section member containing an electronic monitoring and information module for timing, tracking and computing body function data for display on said screen, and sensors adapted to be mounted on said user providing source information for said module.

10. The portable upper body exercise harness of claim 1 having means for detaching each of said crank arms, thereby allowing said user to use only one crank arm.

11. The portable upper body exercise harness of claim 10 in which said means for detaching comprises a quick disconnect latch.

12. The portable upper body exercise harness of claim 1 having means for adjusting a vertical or horizontal position of said crank set on said forward extension member, toward or away from the user.

13. The portable upper body exercise harness of claim 12 in which said means for adjusting comprises said forward extension member having a track engageable with said crank set, whereby a user can readily adjust the height of said crank arms.

14. The portable upper body exercise harness as in claim 5 wherein said linear forward extension member is a telescopic rod with an adjustment locking member.

* * * * *